(12) United States Patent
Nixon et al.

(10) Patent No.: US 6,624,350 B2
(45) Date of Patent: Sep. 23, 2003

(54) SOLAR POWER MANAGEMENT SYSTEM

(75) Inventors: David Nixon, Guelph (CA); Pat Cusack, Plattsville (CA)

(73) Assignee: Arise Technologies Corporation, Waterloo (CA)

( * ) Notice: Subject to any disclaimer, the term of this patent is extended or adjusted under 35 U.S.C. 154(b) by 0 days.

(21) Appl. No.: 09/761,645

(22) Filed: Jan. 18, 2001

(65) Prior Publication Data

US 2002/0108648 A1 Aug. 15, 2002

(51) Int. Cl.[7] .......................... H01L 31/042; H02J 7/35
(52) U.S. Cl. ....................... 136/244; 136/293; 323/906; 323/221; 320/101
(58) Field of Search ................................ 136/244, 293; 323/906, 221; 320/101

(56) References Cited

U.S. PATENT DOCUMENTS 4,742,291 A * 5/1988 Bobier et al. ............... 320/101
5,635,816 A * 6/1997 Welsh et al. ................ 320/102

FOREIGN PATENT DOCUMENTS

WO    WO-99/63415 A1 * 12/1999

* cited by examiner

Primary Examiner—Alan Diamond
(74) Attorney, Agent, or Firm—Katten Muchin Zavis Rosenman

(57) ABSTRACT

A solar power management system includes a plurality of photovoltaic cell panels, and a solar power cell manager coupled to the photovoltaic cell panels. The solar power cell manager includes an input stage for combining current draws from the photovoltaic cells, and a load manager in communication with the input stage for managing the combined current draw.

6 Claims, 3 Drawing Sheets

SOLAR POWER MANAGEMENT SYSTEM

FIELD OF THE INVENTION

The preset invention relates to a system for delivering solar power to a load. In particular, the present invention relates to a solar power management system for interfacing a rechargeable battery to a plurality of photovoltaic cell panels.

BACKGROUND OF THE INVENTION

The conventional solar power management system consists of a plurality of photovoltaic cell panels, a combiner box for interconnecting the photovoltaic cell panels, and a charge controller box connected to the combiner box for controlling the current delivered by the photovoltaic cell panels to a rechargeable battery. Typically, the combiner box and charge controller are used to interface the photovoltaic cell panels with a lead-acid battery or other rechargeable battery, although other loads are also possible.

Although the conventional solar power management system is satisfactory for charging a rechargeable battery over several hours, care must be taken to ensure that the photovoltaic cell panels are connected to the combiner box with the correct polarity to prevent one of the panels from negating the power delivered from the other panels. Also, a short in any of the panels can short out the remaining photovoltaic cell panels. Therefore, there remains a need for a solar power management system which prevents current from being delivered to the load when one of the photovoltaic cell panels fails or is connected with the incorrect polarity.

SUMMARY OF THE INVENTION

According to the invention, there is provided a solar power management system and a solar power cell manager which addresses at least one deficiency of the prior art.

The solar power management system, according to the present invention, includes a plurality of photovoltaic cell panels, and a solar power cell manager coupled to the photovoltaic cell panels. The solar power cell manager includes an input stage for combining current draws from the photovoltaic cells, and a load manager in communication with the input stage for managing the combined current draw.

The solar power cell manager, according to the present invention, includes an input stage for interfacing with a plurality of photovoltaic cell panels, and a load manager in communication with the input stage for controlling current flow between the photovoltaic cell panels and a load.

In the preferred implementation, the solar power cell manager includes a housing, and an input stage and a load manager disposed within the housing. The input stage electrically isolates the photovoltaic cell panels from one another so that operation of the photovoltaic cell panels will not be detrimentally affected if one of the photovoltaic cell panels develops a short or is connected to the solar power cell manager with the incorrect polarity. In addition, the input stage includes a plurality of indicator lamps, each associated with a respective photovoltaic cell panel, to provide a visual indication of whether the associated photovoltaic cell panel is connected to the solar power cell manager with the correct polarity.

BRIEF DESCRIPTION OF THE DRAWINGS

The present invention will now be described, by way of example only, with reference to the accompanying drawings in which.

DETAILED DESCRIPTION OF THE PREFERRED EMBODIMENT

Figure 1:
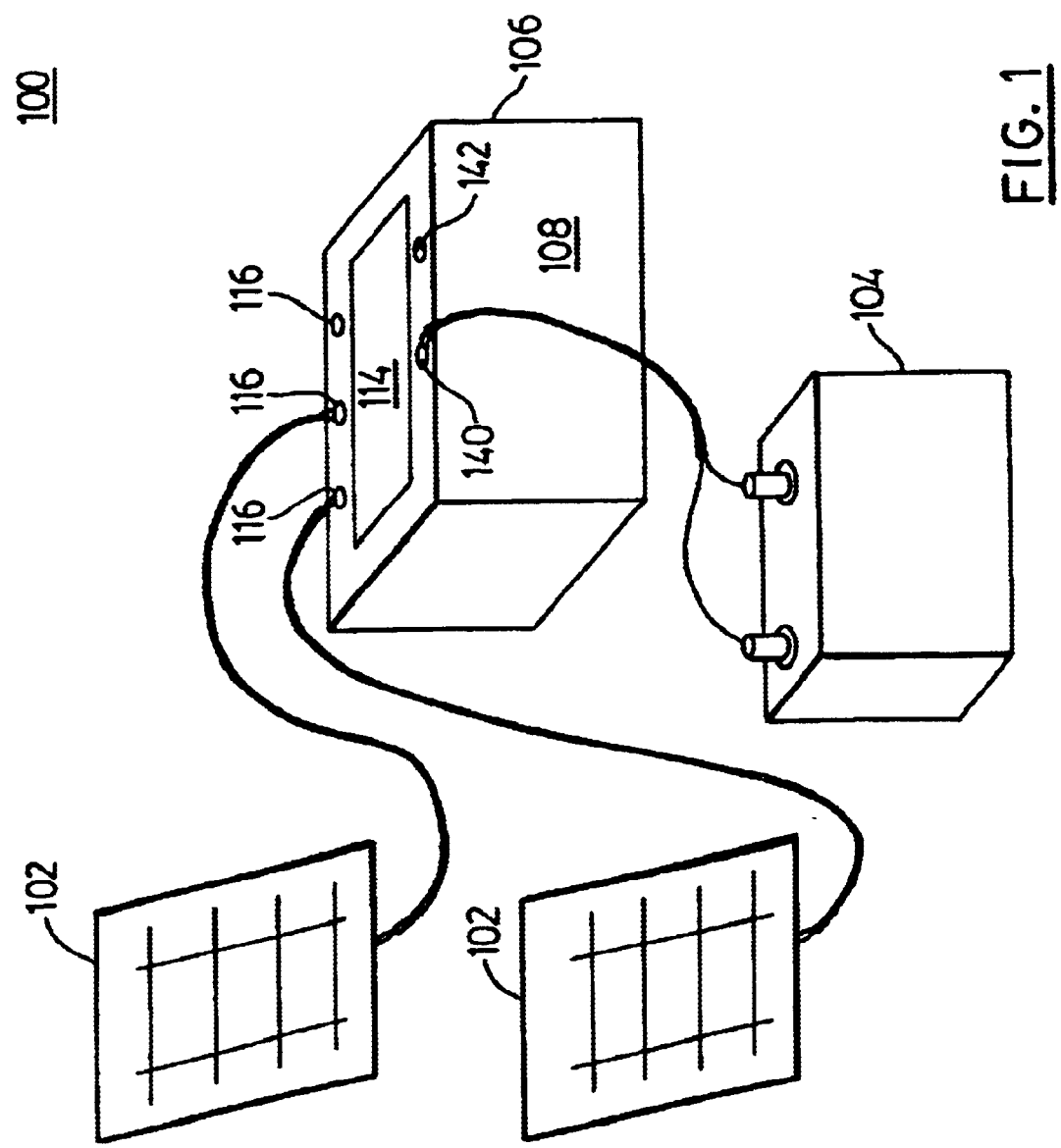
FIG. 1 is a perspective view of the solar power management system, according to the present invention, showing the photovoltaic cell panels, the load, and the solar power cell manager.

Turning to FIG. 1, a solar power management system, denoted generally as 100, is shown comprising a plurality of photovoltaic cell panels 102, a load 104, and a solar power cell manager 106 coupled to the photovoltaic cell panels 102 for interfacing the photovoltaic cell panels 102 with a load 104. Preferred photovoltaic cell panels 102 include Unisolar US32 or Kyocera KC50 solar panels. Also, typically the load 104 comprises a rechargeable battery, although the load 104 may also comprise other types of loads such as DC-AC inverters.

Figure 2:
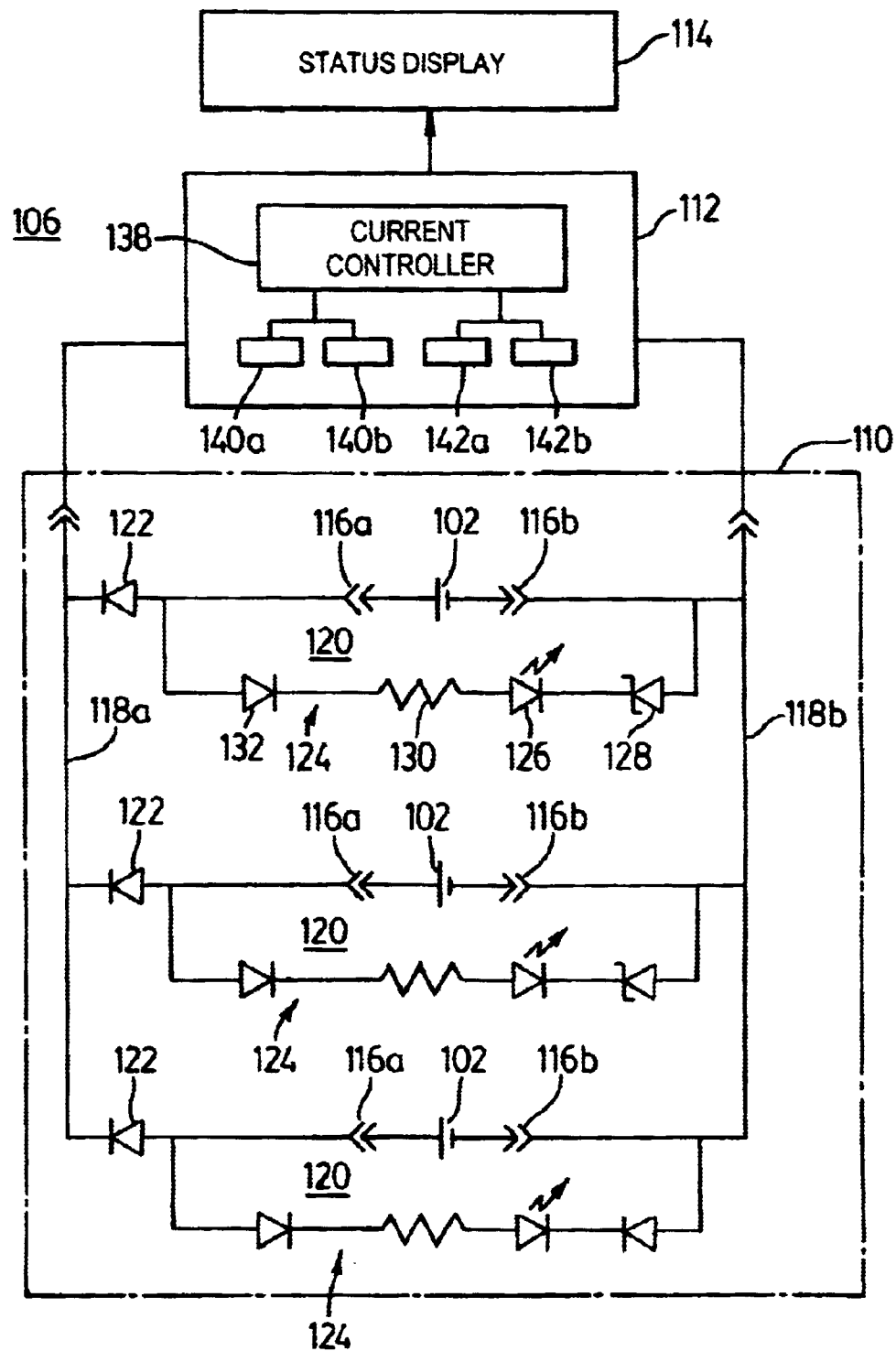
FIG. 2 is a schematic diagram of the input stage and the load manager of the solar power cell manager shown in FIG. 1.

The solar power cell manager 106 includes a housing 108, an input stage 110 and a load manager 112 disposed within the housing 108, and a status display panel 114 provided on an external upper surface of the housing. AS shown in FIG. 2, the input stage 110 includes a plurality of input ports 116 each interfacing with a respective photovoltaic cell panel 102, a positive output voltage bus 118*a* and a negative output voltage bus 118*b* for providing DC power to the load manager 112, and a plurality of separate and distinct interface stages 120 each coupled to a respective input port 116 for conveying current produced by the photovoltaic cell panels 102 to the output bus 118.

As will be apparent, the interface stages 120 are isolated from one another so that operation of the photovoltaic cell panels 102 will not be detrimentally affected if one of the photovoltaic cell panels 102 develops a short or is connected to the solar power cell manager 106 with the incorrect polarity. Preferably, the input ports 116 extend through the upper surface of housing 108 in proximity to the status display panel 114 to allow the photovoltaic cell panels 102 to be easily connected to the solar power cell manager 106.

Each interface stage 120 includes a unidirectional current flow controller 122 in series with the respective input port 116 and in parallel with the output bus 118, and a power sense stage 124 in parallel with the unidirectional current flow controller 122. The unidirectional current flow controller 122 is provided to prevent one of the photovoltaic cell panels 102, connected to the solar power cell manager 106 with the incorrect polarity, from shorting out another of the photovoltaic cell panels 102, connected to the solar power cell manager 106 with the correct (ie. opposite) polarity. As shown, preferably the unidirectional current flow controller 122 comprises a semiconductor diode, however it will be appreciated that other devices, such as diode-connected transistors, may be used as the unidirectional current flow controller 122 instead of a semiconductor diode.

The power sense stage 124 provides a visual indication of whether the associated photovoltaic cell panel 102 is connected to the solar power cell manager 106 with the correct polarity and is providing the solar power cell manager 106 (and the load 104 if connected) with power. As shown, preferably the power sense stage 124 comprises a series circuit of a light emitting diode (LED) 126, a sener diode 128, a current limiting resistor 130 and a blocking diode 132, although other circuit configurations for the power sense stage 122 may be provided without departing from the scope of the invention.

The zener diode 128 limits current flow through the LED 126 until the voltage produced by the associated photovoltaic cell panel 102 reaches a minimum threshold level and, therefore, prevents the LED 126 from illuminating if the voltage produced by the photovoltaic cell panel 102 is less than the minimum threshold level. As will be apparent, the zener diode 128 may be eliminated from the power sense stage 124 if LED illumination control is not a significant concern.

The blocking diode 132 serves to control the current through the LED 126 (in conjunction with the current limiting resistor 130) and also prevents the LED 126 from illuminating when the associated photovoltaic cell panel 102 is connected to the solar power cell manager 106 with the incorrect polarity. As will be apparent, as the LED 126 is itself a diode, the signal diode 132 may be eliminated if the photovoltaic cell panels 102 do not produce a significantly large voltage. However, as typical LEDs do not have particularly good reverse voltage ratings, in many applications some reverse voltage blocking circuit element will be desired.

Figure 3:
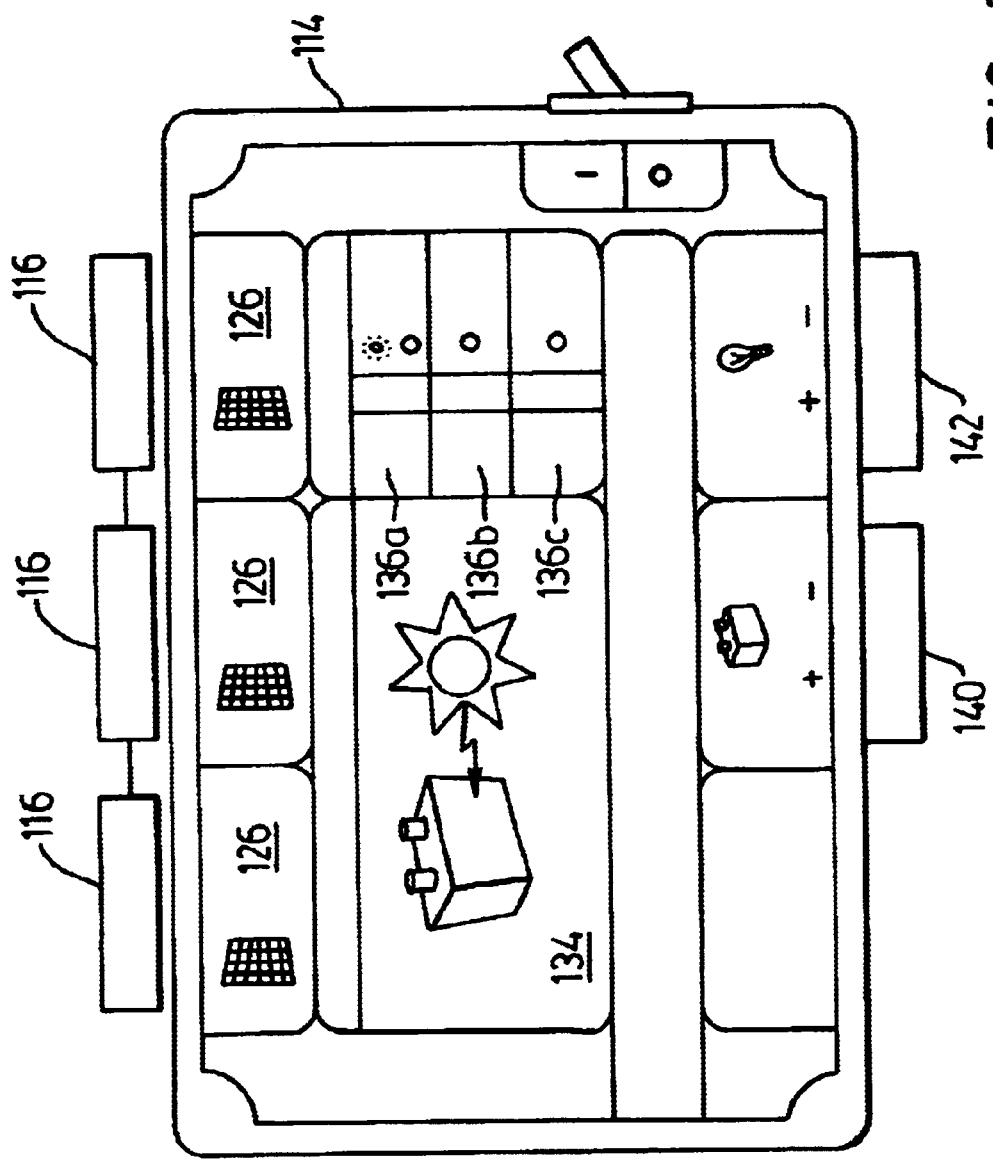
FIG. 3 is a plan view of the status display panel of the solar power cell manager.

As shown in FIG. 3, the LEDs 126 extend through the upper surface of the housing 108 and form part of the status display panel 114 so as to be visible to a user of the solar power cell manager 106. In addition to the LEDs 126, the status display panel 114 includes a battery charging indicator lamp 134 to provide a visual indication that a rechargeable battery is connected to the solar power cell manager 106, and first, second and third battery voltage level indicator lamps 136a, 136b, 136c to provide a visual indication of the voltage level of the rechargeable battery. Preferably, the first battery voltage indicator lamp 136a is a green coloured lamp, the second battery voltage indicator lamp 136b is a yellow coloured lamp, the third battery voltage indicator lamp 136c is a red coloured lamp. However, the indicator lamps 136 may be replaced with a single multicoloured LED, if desired.

The load manager 112 is in communication with the input stage 110 via the output bus 118, and comprises a current controller 138, a pair of battery charging terminals 140a, 140b for interfacing with a rechargeable battery, and a pair of load terminals 142a, 142b for interfacing with an external load (such as a DC-AC inverter). Preferably, the terminals 140, 142 extend through the upper surface of housing 108 in proximity to the status display panel 114 to allow the rechargeable battery and/or the external load to be easily connected to the solar power cell manager 106.

The load manager 112 is configured to control the current flow from the photovoltaic cell panels 102 to the external load and/or a 12 volt rechargeable battery. Further, the current manager 112 interfaces with the status display panel 114 and controls the charging indicator lamp 134 and the voltage indicator lamps 136. Preferably, the load manager 112 is configured to:

(1) cause the first (green) voltage indicator lamp 136a to blink when the rechargeable battery holds a full charge;

(2) continuously illuminate the first (green) voltage indicator lamp 136a when the charge held by the rechareable battery is at least 70% of the full charge;

(3) continuously illuminate the second (yellow) voltage indicator lamp 136b when the charge held by the rechargeable battery is at between 30% and 70% of the full charge;

(4) cause the third (red) voltage indicator lamp 136c to blink when the charge held by the rechargeable battery is less than 30% of the full charge; and (5) continuously illuminate the third (red) voltage indicator lamp 136c when the rechargeable battery is not connected to the solar power cell manager 106.

A suitable load manager 112 for the purposes disclosed herein is the Morningstar charge controller, as described in U.S. Pat. No. 5,635,816, the entire contents of which are incorporated herein by reference.

The present invention is defined by the claimed appended hereto, with the foregoing description being illustrative of the preferred embodiment of the present invention. Those of ordinary skill may envisage certain additions, deletions and/or modifications to the described embodiment which, although not explicitly suggested herein, do not depart from the spirit or scope of the present invention, as defined by the appended claims.

We claim:

1. A solar power management system comprising:
   a plurality of photovoltaic cell panels; and
   a solar power cell manager coupled to the photovoltaic cell panels, the solar power cell manager including:
      an input stage coupled to the photovoltaic cell panels; and
      a load manager in communication with the input stage for controlling current flow between the photovoltaic cell panels and a load, the input stage including a plurality of interface stages, each said interface stage comprising:
         an input port coupled to a respective one of the photovoltaic cell panels;
         a unidirectional flow controller in series with the input port for isolating the one photovoltaic cell panel from the load manager in the event of a reverse connection of the one photovoltaic cell panel to the input port; and
         a visual indicator coupled to the input port for providing a visual indication of the current flow from the one photovoltaic cell panel to the load manager.

2. A solar power cell manager comprising:
   an input stage for interfacing with a plurality of photovoltaic cell panels; and
   a load manager in communication with the input stage for controlling current flow between the photovoltaic cell panels and a load, the input stage including a plurality of interface stages, each said interface stage comprising:
      an input port for connecting to a respective one of the photovoltaic cell panels;
      a unidirectional flow controller in series with the input port for isolating the one photovoltaic cell panel from the load manager in the event of a reverse connection of the one photovoltaic cell panel to the input port; and
      a visual indicator coupled to the input port for providing a visual indication of the current flow from the one photovoltaic cell panel to the load manager.

3. The solar power management system of claim 1, wherein the unidirectional flow controller comprises a semiconductor diode.

4. The solar power management system of claim 3, wherein the visual indicator comprises a light emitting diode.

5. The solar power cell manager of claim 2, wherein the unidirectional flow controller comprises a semiconductor diode.

6. The solar power cell manager of claim 5, wherein the visual indicator comprises a light emitting diode.

* * * * *